Aug. 28, 1945.  D. M. SMITH  2,383,825
PISTON PACKING
Filed Jan. 6, 1940
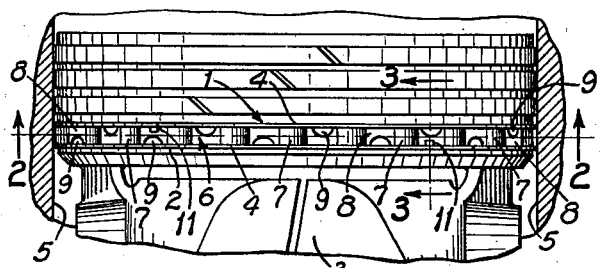
FIG.1.
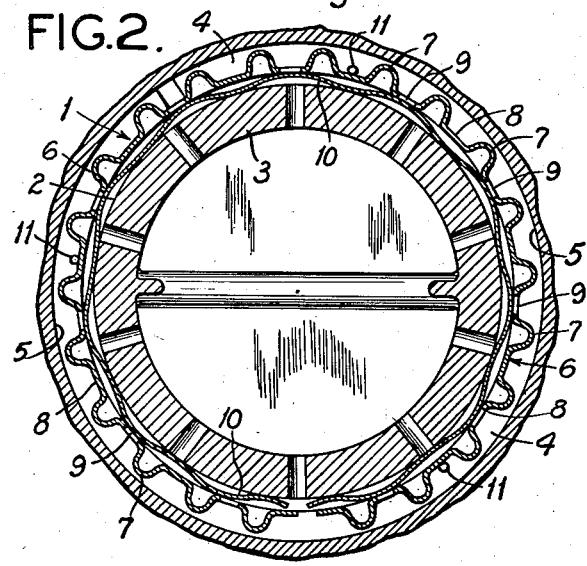
FIG.2.
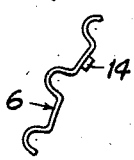
FIG.8.
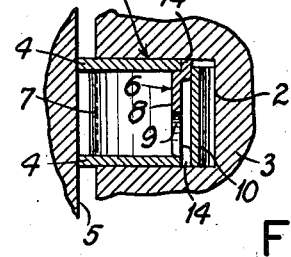
FIG.9.
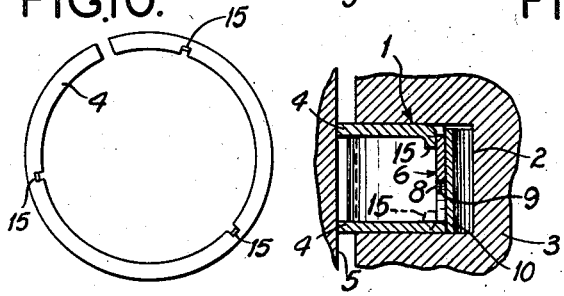
FIG.10.   FIG.11.
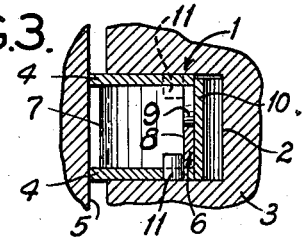
FIG.3.
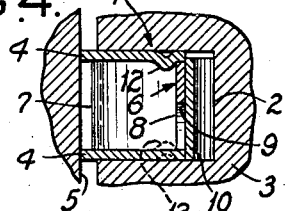
FIG.4.
FIG.5.
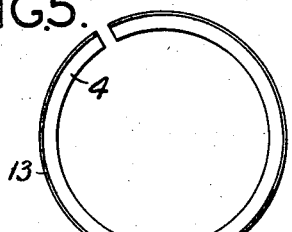
FIG.6.
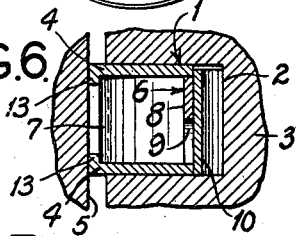
FIG.7.
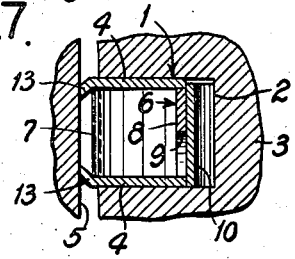
INVENTOR:
DALLAS M. SMITH
BY J. Henry Kinealy
ATTORNEY Patented Aug. 28, 1945

2,383,825

UNITED STATES PATENT OFFICE 2,383,825

PISTON PACKING

Dallas M. Smith, Kirkwood, Mo., assignor to McQuay-Norris Manufacturing Company, St. Louis, Mo., a corporation of Delaware Application January 6, 1940, Serial No. 312,760

5 Claims. (Cl. 309—45)

My invention relates to piston packings and more particularly to multiple piece piston packings adapted to provide a fluid tight seal between the piston and the cylinder in which the piston reciprocates.

Multiple piece piston packings as used heretofore, usually included a plurality of thin, resilient ring members formed of ribbon steel and adapted to contact the cylinder wall. The ring members were positioned in a ring groove of the piston and frequently the entire ring groove was occupied by the ring members positioned therein so that adjacent faces of the ring members were in contact with each other. In some instances, however, it was desirable to provide only a single pair of ring members and the remaining space in the ring groove was occupied by a spacer located between the ring members and arranged to maintain the ring members in a predetermined position axially of the ring groove. Various kinds of spacers were used heretofore, including both resilient and non-resilient spacers which usually contacted the cylinder wall either because of their inherent resiliency or due to movement of the spacer in the ring groove.

Sometimes, it is found desirable to prevent the spacer from engaging or contacting the cylinder wall by limiting radial expansion and movement of the spacer. In order that this might be accomplished successfully, my invention contemplates, in its broadest aspects, a piston packing comprising one or more thin resilient ring members of the kind described briefly above and a spacer positioned adjacent thereto to occupy the remainder of the ring groove and to maintain the ring members in a predetermined position axially thereof. Means are provided to permit only limited radial expansion and movement of the spacer whereby the spacer is prevented from contacting the cylinder wall. In the narrower aspects of my invention the means may include projections, such as pins, ears or teats protruding above the surface of the face of a ring member adjacent the spacer, or it may include ears formed on the spacer itself and arranged to engage the rear faces of the ring members.

Having thus briefly described my invention, one object thereof is to provide a multiple piece piston packing which will provide a fluid tight seal between the piston and the cylinder in which the piston reciprocates.

A more specific object of my invention is to provide a piston packing comprising one or more ring members and a spacer which is prevented from contacting the cylinder wall by limiting radial expansion and movement thereof.

Other objects and advantages will be apparent to those skilled in the art from the following description wherein reference is made to the drawing illustrating several preferred embodiments of my invention and wherein like reference numerals designate like parts throughout the several views.

In the drawing,

Fig. 1 is an elevation of a piston packing constructed according to my invention and showing the packing located in a ring groove of a piston.

Fig. 2 is a horizontal section on the line 2—2 of Fig. 1.

Fig 3 is a vertical section on the line 3—3 of Fig. 1.

Fig 4 is a vertical section similar to Fig. 3 showing a second embodiment of my invention.

Fig. 5 is a plan view of a ring member utilized in a third embodiment of my invention.

Fig. 6 is a vertical section similar to Fig. 3 showing a pair of ring members similar to the ring member of Fig. 5 located in the ring groove of a piston and incorporated in a piston packing constructed according to my invention.

Fig. 7 is a vertical section showing a fourth embodiment of my invention.

Fig. 8 shows a portion of a spacer having ears formed thereon and utilized in a fifth embodiment of my invention.

Fig. 9 is a vertical section showing the fifth embodiment of my invention and showing the spacer of Fig. 8 located in the ring groove of a piston.

Fig. 10 is a plan view of a ring member utilized in a sixth embodiment of my invention, and Fig. 11 is a vertical section showing the sixth embodiment of my invention and showing the ring member of Fig. 10 located in a ring groove of a piston.

Referring to the figures, a multiple piece piston packing 1 is shown located in the lowermost ring groove 2 of a piston 3 and comprising a pair of thin, resilient ring members 4 formed of ribbon steel bent edgewise and adapted to engage the cylinder wall 5. Positioned between the ring members 4 and adapted to separate the ring members from each other, is a spacer 6 which, in the embodiment shown, is formed also of ribbon steel bent flatwise and arranged to provide substantially U-shaped portions 7 joined by connecting portions 8 therebetween. By forming the spacer 6 as described above, the effective cross-sectional area of the spacer defined by the inner and outer peripheries thereof is greater than the cross-sectional area of the material from which the spacer is made. The spacer 6 is substantially circular in form so that it may be located conveniently in the ring groove 2 of a piston 3. As is the usual custom, when the piston packing 1 is used as an oil ring, openings 9 may be formed in the connecting portions 8, as shown in the drawing, or the openings may be formed in the U-shaped portions 7 so that oil scraped from the cylinder walls by the ring members may pass from the ring groove into the interior of the piston.

The piston packing also may include a ring expander 10 which preferably is located in the ring groove between the bottom thereof and rear faces of the ring members, and the expander is adapted and arranged to exert radial force on the ring members so that the ring members, in turn, exert a substantially high pressure per unit area on the cylinder wall.

As implied above, the essence of my invention is to provide a piston packing wherein radial expansion and movement of the spacer is limited so that the spacer will not engage or contact the cylinder wall 5. In Figs. 1, 2 and 3, radial expansion of the spacer 6 is limited by pins 11 attached to the ring members 4 and projecting beyond the faces of the ring members adjacent the spacer 6. In Fig. 4, radial expansion of the spacer 6 is limited by teats 12 pressed from the ring members 4 and protruding beyond the surfaces of the faces of the ring members adjacent the spacer 6. In the embodiments of Figs. 1 to 4, inclusive, described above, the projecting surfaces engage the connecting portions 8 of the spacer and thereby limit radial expansion thereof so that the spacer 6 cannot engage the cylinder wall 5.

In Figs. 5 and 6, radial expansion of the spacer 6 is limited by a flange 13 formed at the outer edge of the ring members 4 and projecting beyond the surfaces of the faces of the ring members adjacent the spacer 6. Fig. 7 shows substantially the same means for limiting radial expansion of the ring members as is shown in Fig. 6 except that the ring members 4 are bent slightly at their outer edges instead of having flanges 13 formed thereon. In the embodiments of Figs. 5, 6 and 7, the projecting surface on the ring members 4 extends completely around the ring members and at its outer extremity it engages the cylinder wall and at its inner extremity it engages the U-shaped portions 7 of the spacer 6 to limit radial expansion and movement thereof and to prevent the spacer 6 from engaging the cylinder wall 5.

In the embodiment of Figs. 8 and 9, projecting ears 14 are formed on the spacer 6 itself and these ears engage the rear faces of the ring members 4 and thereby limit radial expansion of the spacer 6. In the embodiment of Figs. 10 and 11, projections are formed on the ring members 4 by slotting the rear portion of the ring members at intervals and bending the slotted portions 15 so that they protrude above the surface of the faces of the ring members adjacent the spacer 6. As in the embodiments of Figs. 1 to 4, inclusive, the projections of the embodiment shown in Figs. 10 and 11 engage the connecting portions 8 of the spacer 6 to limit radial expansion thereof.

As stated above projections on the ring members 4 or ears on the spacer 6 limit radial expansion and movement of the spacer so that the spacer cannot engage or contact the cylinder wall and, in this way, wear of the spacer by such contact is avoided. Also, if the spacer 6 is made of resilient material, the force per unit area of the ring members 4 on the cylinder wall 5 is increased an amount equal to the force exerted on the ring members by the spacer since radial expansion of the spacer is limited by the projections on the ring members.

While I have described several embodiments of my invention it is to be understood that I do not limit myself to the forms and arrangements shown and described because other arrangements may be used also without deviating from the scope of my invention. For instance, when pins or teats are used on the ring members to project above the faces thereof adjacent the spacer it will be found that three such pins or teats positioned at equal intervals on the ring members are sufficient to limit radial expansion and movement of the spacer so that the spacer will not contact or engage the cylinder wall. However, it should be understood that any convenient number may be used, as exemplified in Figs. 5, 6 and 7, where the projecting surface extends completely around each ring member.

Although, the embodiments shown in the drawing, each include a pair of ring members 4, it should be understood that the piston packing may include only a single ring member, and the projections on the ring member then may be formed on the face of the ring member adjacent the spacer.

What I claim as new and desire to secure by Letters Patent is:

1. A piston packing comprising a pair of thin resilient ring members formed of ribbon steel and adapted to engage the cylinder wall, a spacer positioned between said ring members and formed of ribbon material bent flatwise and arranged to provide substantially U-shaped portions joined by connecting portions therebetween, said spacer being substantially circular in form and being arranged so that the effective cross-sectional area of the spacer defined by the inner and other peripheries thereof is greater than the cross-sectional area of the material from which the spacer is made and so that portions of the outer face of said spacer are positioned a considerable distance inwardly from the cylinder engaging faces of said ring members, and said ring members having projections formed on faces thereof removed from the cylinder wall and adjacent said spacer and adapted to engage said spacer at said portions so that radial expansion thereof is limited and so that portions of said spacer adjacent said cylinder wall cannot come in contact therewith, and a ring expander positioned between the bottom of said ring groove and the rear faces of said ring members and adapted to exert radial force on said ring members.

2. A piston packing comprising a thin resilient ring member formed of ribbon material and adapted to engage the cylinder wall, a spacer positioned adjacent said ring member and arranged to maintain said ring member in substantially predetermined axial position in the ring groove of a piston in which said packing is used, said ring member having at least two spaced protuberances on a face thereof adjacent said spacer, said spacer being shaped and arranged so that portions of said spacer extend radially outwardly beyond said protuberances and other portions of said spacer are positioned behind said protuberances and in engagement therewith to limit radially outward movement of the spacer relative to said ring member and to limit relative circumferential movement between said member and said spacer.

3. A piston packing comprising a thin resilient ring member formed of ribbon material and adapted to engage the cylinder wall, a spacer positioned adjacent said ring member and arranged to maintain said ring member in substantially predetermined axial position in the ring groove of a piston in which said packing is used, said spacer having substantially U-shaped portions and connecting portions therebetween, said ring member having at least two spaced protuberances on the face thereof adjacent said spacer, the U-shaped portions of said spacer extending radially outwardly beyond said protuberances and being arranged therebetween to permit only limited circumferential movement of said spacer relative to said ring member, certain of said connecting portions of said spacer being positioned behind said protuberances and in engagement therewith to permit only limited radial movement of said spacer relative to said ring member.

4. A piston packing comprising, a thin resilient ring member formed of ribbon material and adapted to engage the cylinder wall, a spacer positioned adjacent said ring member and arranged to maintain said ring member in substantially predetermined axial position in the ring groove of the piston in which said packing is used, said ring member having at least two spaced protuberances on a face thereof adjacent said spacer and located adjacent the inner periphery of said ring member, said spacer being shaped and arranged so that a plurality of portions of said spacer extend radially outwardly substantially beyond said protuberances to a point nearer to the outer periphery of the ring member than to the inner periphery thereof, and other portions of said spacer being positioned behind said protuberances and in engagement therewith to limit radially outward movement of the spacer relative to said ring member and to limit relative circumferential movement between said ring member and said spacer.

5. A piston packing comprising a thin, resilient ring member formed of ribbon material and adapted to engage the cylinder wall, a spacer positioned adjacent said ring member and arranged to maintain said ring member in substantially predetermined axial position in the ring groove of a piston in which said packing is used, said spacer having substantially U-shaped portions and connecting portions therebetween, said ring member having at least two spaced protuberances on the face thereof adjacent said spacer and located adjacent the inner periphery of said ring member, the U-shaped portions of said spacer extending radially outwardly substantially beyond said protuberances to a point nearer to the outer periphery of the ring member than to the inner periphery thereof and being arranged therebetween to limit circumferential movement of said spacer relative to said ring member, certain of said connecting portions of said spacer being positioned behind said protuberances and in engagement therewith to limit radial movement of said spacer relative to said ring member.

DALLAS M. SMITH.